Nov. 7, 1967  S. R. CRAY ETAL  3,351,923
COINCIDENT CURRENT INHIBIT SYSTEM
Filed July 8, 1964  4 Sheets-Sheet 1

INVENTORS
SEYMOUR R CRAY
PAUL A. KRISTENSEN
BY Cushman, Darby & Cushman
ATTORNEYS

INVENTORS
SEYMOUR R. CRAY
PAUL A. KRISTENSEN

Nov. 7, 1967  S. R. CRAY ETAL  3,351,923
COINCIDENT CURRENT INHIBIT SYSTEM
Filed July 8, 1964  4 Sheets-Sheet 4
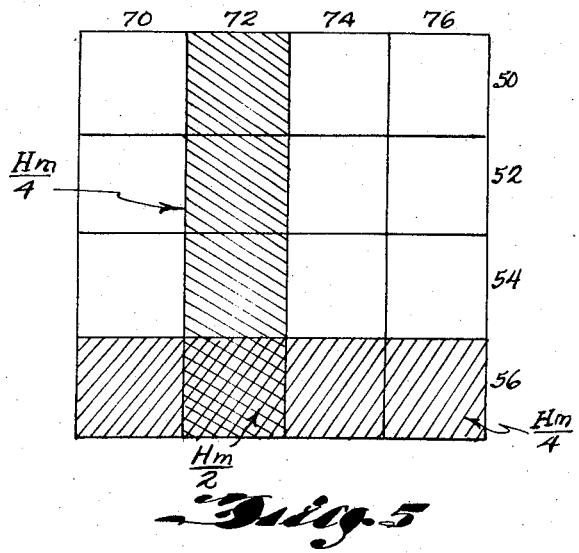
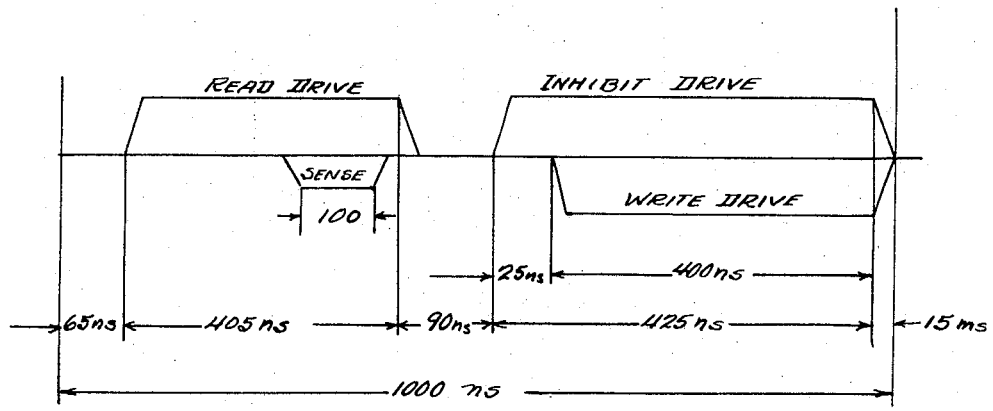
INVENTORS
SEYMOUR R. CRAY
PAUL A. KRISTENSEN
BY
Cushman, Darby & Cushman
ATTORNEYS

3,351,923
COINCIDENT CURRENT INHIBIT SYSTEM
Seymour R. Cray, Chippewa Falls, Wis., and Paul A. Kristensen, Bad Homburg vor der Hohe, Germany, assignors to Control Data Corporation, Minneapolis, Minn., a corporation of Minnesota
Filed July 8, 1964, Ser. No. 381,034
10 Claims. (Cl. 340—174)

This invention relates to a coincident current inhibit system and more particularly to an inhibit means including the use of low inhibit currents which minimize disturbances on magnetic cores within a magnetic core memory matrix.

Prior art discloses several inhibiting current techniques or methods which may be used for the inhibiting sequence of a memory reference cycle. A first method of inhibiting in a magnetic core memory uses a single inhibit line which is threaded through each core in a memory plane. When a core is to be inhibited, a full inhibit current is applied to the single line thereby disturbing each core in the memory plane with the full effects of the inhibit current.

A second method utilizes the single inhibit line technique of the first method. However, the single inhibit line performs two functions. The first function of the line is as a sense line for use during a read sequence of memory reference cycle. The second function is as an inhibit line which would be used during inhibiting of a write sequence. Nevertheless, each core in the memory plane is again disturbed by the full effect of the inhibit current as in the first method.

A third inhibit method used requires dividing the memory plane of a magnetic core matrix into separate areas. Each area has its own inhibit line. Each inhibit line carries the full inhibit current. When a core is to be inhibited, only the cores in that area of the memory containing the core is subject to the full disturbance of the inhibit current. This method has the effect of restricting the number of cores subject to the effects of the full inhibit current. However, each inhibit line still carries a full inhibit current.

A fourth inhibit method utilizes a single inhibit line which is threaded through each core in a memory plane. The single inhibit line is first threaded through each core separately in one direction (horizontal for example) and then through each core separately in another direction (vertical for example). Thereafter, an inhibit current having one half the amplitude is applied to the single inhibit line. The inhibit current is passed through each core twice due to the fact that the inhibit line passes through each core twice. The two half amplitude currents will add together within each core and subject that core to the full effects of the inhibit current. Thus, the inhibit current applied to the inhibit line is of a lower amplitude, but each core is still subject to the full effects of the inhibit current.

In addition to the inhibit current disturbances, each method requires that a time delay occur between each successive memory reference cycle to allow the inhibit current to decay to a minimum value before the next read sequence of a subsequent memory reference cycle can be initiated. Each of the above described methods are used in digital computers. Thus, the processing time of a digital computer is dependent upon and is limited by the memory reference cycle time. If the decay time of the inhibit current is reduced, the timing between successive memory reference cycles can be reduced, ultimately resulting in faster computer processing time.

It is an object of this invention to provide a means of eliminating the disturbances of inhibit currents on a substantial number of magnetic cores within a memory plane during an inhibiting sequence.

It is another object of this invention to reduce the amount of disturbances on the magnetic cores which are subject to the inhibit currents in a memory plane during an inhibiting sequence.

Yet another object of this invention is to minimize the noise level of operation and transient conditions which are induced into the memory by inhibit currents.

It is a further object of this invention to provide a means for substantially reducing the time decay of the inhibit current thereby increasing the overall speed between successive memory reference cycles whereby the overall processing speed of a digital computer is greatly increased.

These and other objects and the entire scope of the invention will become more fully apparent when considered in light of the following detailed description of an illustrative embodiment of this invention and from the appended claims.

The illustrative embodiment may be best understood by reference to the accompanying drawings within:

FIGURE 5 is an illustration of the disturbed and undisturbed areas of a memory plane and the relative magnitude of the disturbances due to the effects of the inhibit current.

FIGURE 6 is a graph illustrating the pulse sequence of a typical memory reference cycle.

Briefly, the coincident current inhibit system comprises a plurality of bi-stable magnetic elements electrically arranged in an array of columns and rows. Driving means are electrically coupled to the elements for selectively energizing a selected element in one sense and with sufficient excitation to effect a change of state of the selected element. A first inhibiting means includes means for energizing the elements in the column having the selected element, simultaneous with and in a sense opposite to that of the driving means. A second inhibiting means for coupling in series the elements of each row includes means for energizing the cores in the row having the selected element, simultaneously with and in a sense opposite to that of the driving means and in coincidence with the first inhibit means. The first inhibiting means and the second inhibiting means are in coincidence and have sufficient excitation to prevent a change in state of the selected element.

Before proceeding with the description of the coincident current inhibit system in its entirety, the principle of magnetic core storage will first be described. A typical hysteresis loop diagram of a magnetic core is shown in FIGURE 1 and the basic memory core matrix is shown in FIGURE 2.

The magnetic core memory uses a core of ferrite material which has high remanent magnetization properties which enable the core to be a bistable device and thus capable of functioning as a memory element. The magnetic properties of a typical core are represented by its hysteresis loop, shown in FIGURE 1, in which the magnetic flux density B is plotted as a function of field intensity H. If the current flow sufficient to cause a field intensity of $+H_m$ is applied to the core, the flux density increases to saturation $+B_s$. When current is removed, the flux density drops to the residual value $+B_r$ and remains there. When the magnetic core is at the residual value of $+B_r$, for purpose of discussion this is designated as the "0" state. Thereafter, application of current flow in the opposite direction sufficient to cause a field intensity of $-H_m$ reverses the flux density to $-B_s$. When the current is removed and the flux density drops to the residual value $-B_r$, for purpose of discussion this shall be designated as the "1" state.

The above discussion is centered about a bistable magnetic core having a square hysteresis loop. However, there are other magnetic elements which are bistable and have a hysteresis loop. An example of such a magnetic element would be a thin magnetic film. It is anticipated that the inventive coincident current inhibit system would include the use of such magnetic elements.

Figures 1, 2:
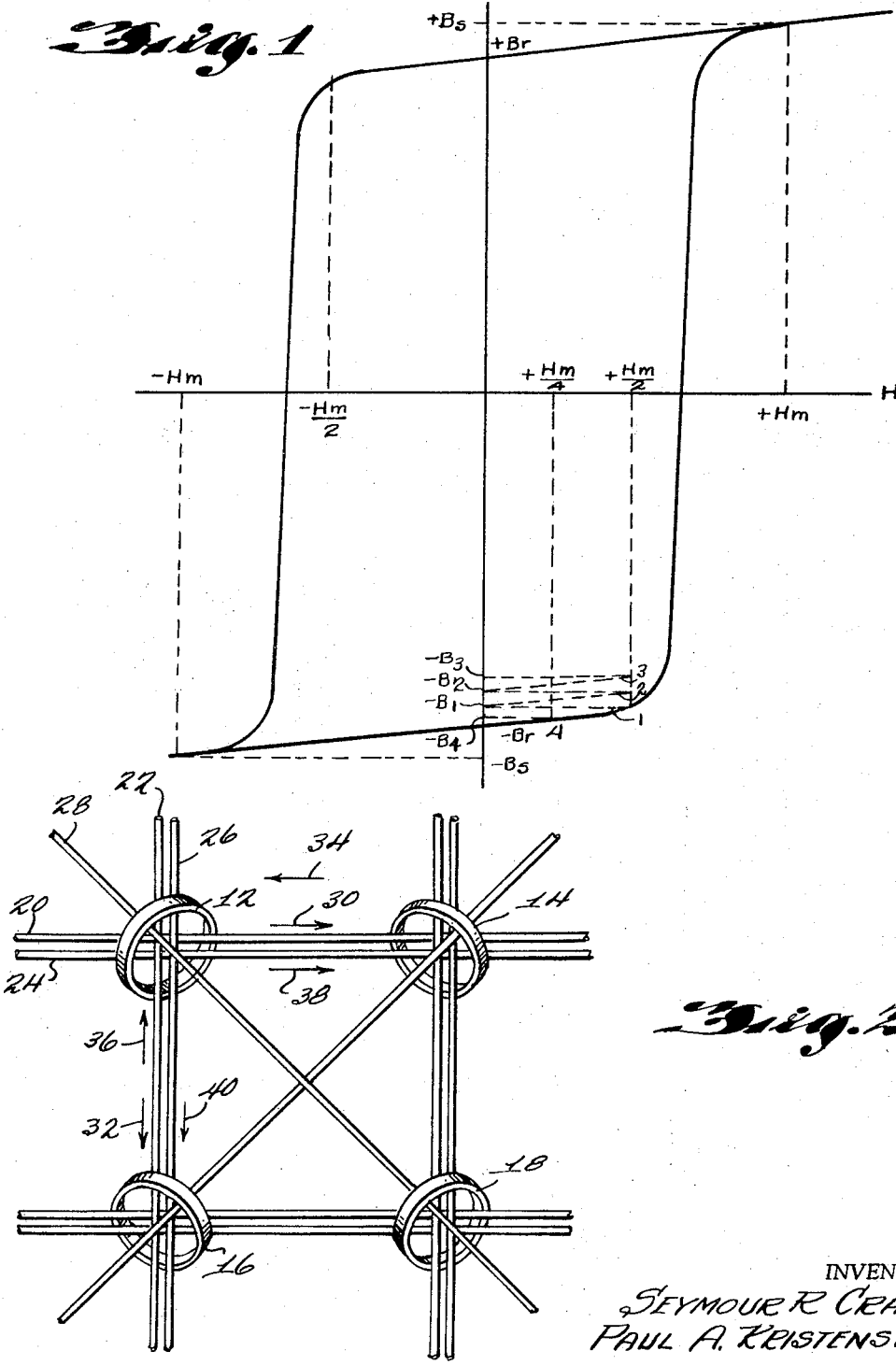
FIGURE 1 is an illustration of a typical hysteresis diagram of a magnetic core used in a coincident current inhibit system.
FIGURE 2 is a diagram of a basic magnetic core memory of a coincident current inhibit system.

Refer now to FIGURE 2. Each magnetic core 12, 14, 16 and 18 is threaded or coupled by five lines. For example, core 12 is coupled by lines 20, 22, 24, 26 and 28. In this embodiment, drive lines 20 and 22 are the horizontal and vertical drive lines respectively. Each drive line conducts a current having an amplitude equal to one half of the current necessary to switch the state of a magnetic core. These drive lines are used for both "read" and "write" portions of a memory reference cycle. Hereinafter, the drive current in each drive line shall be referred to as a half amplitude drive current.

Lines 24 and 26 are inhibit drive lines. Each inhibit drive line will have a current flowing therein to prevent or inhibit the "write" current from driving the magnetic core causing it to switch its state. The amplitude of the current flowing in the inhibit lines 24 and 26 will be equal to one-quarter of the current necessary to switch the magnetic core state. Hereinafter, the inhibit current in each inhibit line shall be referred to as a quarter amplitude drive current.

Line 28 is a sense line upon which a voltage is induced by the magnetic core when it is driven from one magnetic state to another.

At this point, an operation through a complete memory reference cycle including the use of the inventive coincident current inhibit system will now be considered. If the assumption is made that a core is originally in the "1" state, a memory reference cycle includes a read sequence which drives that core from its "1" state to its "0" state. Thereafter, a write sequence will attempt to drive the core back to the "1" state. If the core is to remain in the "0" state, the write attempted is inhibited by the inhibit sequence.

Assume that cores 12, 14, 16 and 18 are in the "1" state. Further assume that the core 12 is to be selected and is to be changed from the "1" state to a "0" state. Core 12 will be addressed by simultaneously passing a "read" current pulse through lines 20 and 22. The current on line 20 will be in the direction of left to right as illustrated by arrow 30. The current in line 22 will be from the bottom to the top as illustrated by arrow 32. As discussed hereinbefore, each drive current is half amplitude drive current.

Since core 12 is the only core in the memory plane subjected to the field intensity of two half amplitude current pulses, core 12 will switch its magnetic state from "1" to "0." Cores 14, 16 and 18 will be subject only to half amplitude current pulses. The half amplitude drive current produces a field intensity which will not switch the core. When core 12 switches, a pulse will be induced into sense line 28 which detects that the magnetic core was driven from the "1" state to the "0" state by the read current.

The subsequent writing sequence is dependent upon whether the information to be stored in the memory is a "1" or a "0." Since storage of a "0" requires inhibiting, it will be assumed that a "0" is to be stored in core 12.

Core 12 is again addressed by passing half amplitude write current pulse in the direction illustrated by arrows 34 and 36 through the drive lines 20 and 22 respectively. The write current magnitude is of opposite polarity to the read current. Concurrently, core 12 is addressed by quarter amplitude inhibit current pulses in the direction shown by arrows 38 and 40 appearing on the inhibit lines 24 and 26 respectively. At this point, note that the inhibit lines are each carrying only a quarter of the current necessary to switch a core's magnetic state. The magnetic forces acting on core 12 are as follows: The half amplitude write current pulses 34 and 36 produce a field intensity, which when summed together at the intersection of the two drive wires 20 and 22 respectively would, if acting independently, switch the core from the "0" state back to the "1" state. However, the quarter amplitude inhibit current pulses 38 and 40 produce a field intensity, which when summed together at the intersection of the two inhibit wires 24 and 36 is equal to one half the field intensity necessary to switch the core 12. Further, this half field intensity of the inhibit current pulses is of opposite polarity relative to that of the total field intensity produced by the write drive current pulses. The net field intensity acting on core 12 is a magnetizing force which is insufficient to switch the core's magnetic state. Cores 14, 16 and 18 receive only a half amplitude write current pulse, and cores 14 and 16 receive a quarter amplitude inhibit current pulse in the opposite direction which tends to reduce the effects on the half amplitude write current pulses.

Figure 3:
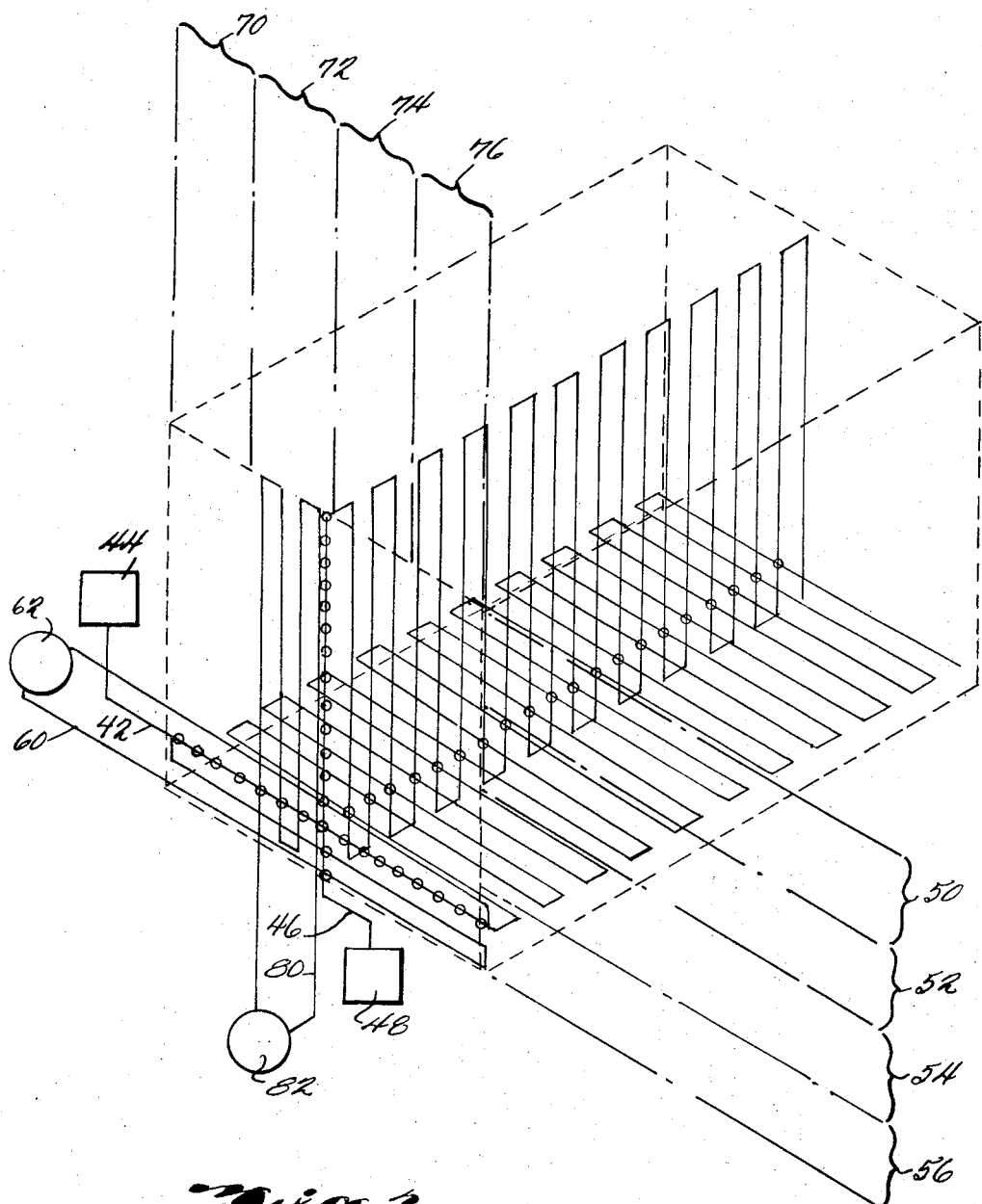
FIGURE 3 is an illustration of the intersection of the coincident current inhibit lines and the drive lines in a typical memory plane assembly.

Consider now FIGURE 3 which is an illustration of the intersection of the coincident current inhibit lines and the drive lines in a memory plane assembly. A memory plane assembly comprises a plurality of memory core planes. Each core within the memory core plane is capable of storing one bit of information. Also, the number of memory planes within a memory plane assembly may be directly proportional to the length of the word desired to be stored. FIGURE 3 illustrates, on the first memory plane a possible, but not exclusive, arrangement of a plurality of coincident inhibit drive lines. Assuming that in this discussion of the memory plane assembly, that the read-write half amplitude current driver lines are such that a drive line is threaded continuously through the same row of cores in each memory plane as shown. Further assume that each half amplitude current driver is capable of driving either a read current or a write current pulse on the drive line. A typical example is horizontal drive line 42 connected to horizontal driver 44, or vertical drive line 46 conected to vertical driver 48. Referring to the first memory plane of the assembly, the horizontal dimensions of the memory plane is divided into four parallel rectangular sections. Each section has a separate continuous inhibit line which threads all the cores of that section. A typical inhibit line 60 is threaded through the cores of section 56. Each horizontal inhibit line has a separate current generator, for example 62, which supplies the quarter amplitude inhibit current pulse. Sections 50, 52 and 56 have identical electrical and physical arrangements (not shown). Referring to the vertical dimension of the memory plane, this dimension also is subdivided into four parallel rectangular or column sections, 70, 72, 74 and 76. Each column section has a separate inhibit line which threads all the cores of that section. A typical inhibit line 80 is threaded through the cores of section 72. Each vertical inhibit line has a separate current generator, for eaxmple 82, which supplies the quarter amplitude inhibit current pulse. Sections 70, 74, and 76 have the same electrical and physical arrangements (not shown). Thus, each memory plane has a plurality of inhibit generators and drive lines similar to the plane hereinbefore described.

The coincident current system intends to utilize a plurality of inhibit lines and a plurality of sections. The sub-division into four inhibit lines and four rectangular areas are purposes of example and are not intended to limit or restrict their application.

Figure 4:
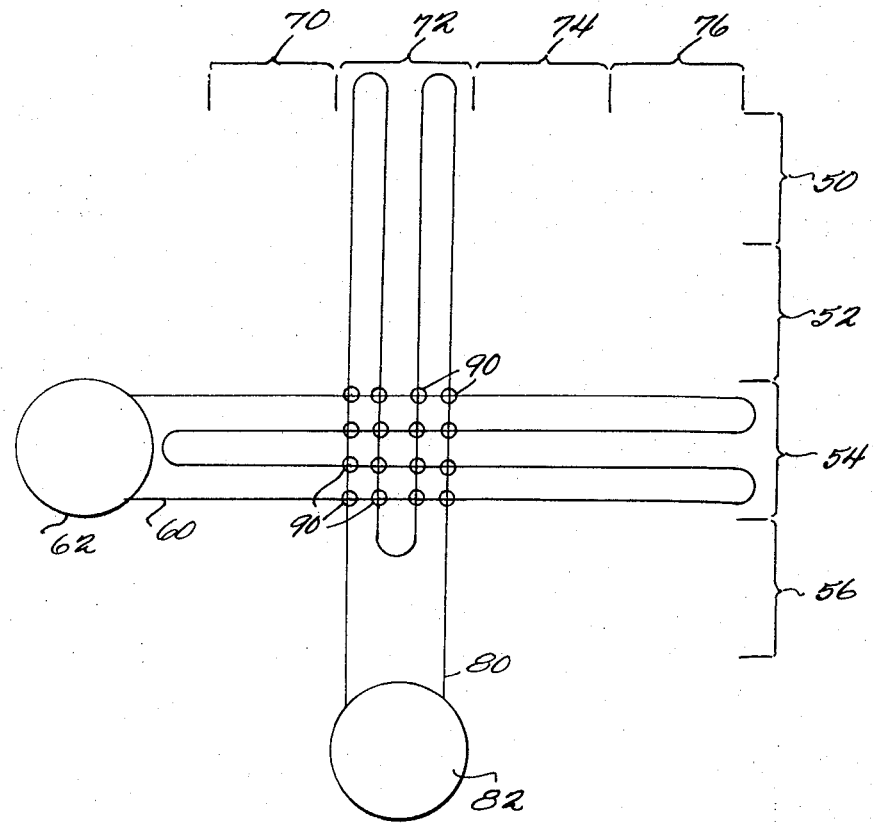
FIGURE 4 is an illustration of the inhibit line grouping of FIGURE 3.

FIGURE 4 shows in greater detail the grouping of the inhibit lines shown in FIGURE 3 within a memory plane. The magnetic cores, all shown as 90, are subject to the coincidence of the inhibit currents and are fully inhibited during the inhibiting sequence of a memory cycle.

Now consider a typical example of operation using FIGURE 3. When a memory reference cycle is initiated, the selected core from which information is to be detected and then stored is addressed by selecting the appropriate horizontal and vertical current generators 44 and 48. Any type of selecting schemes (not shown) for addressing the read or write drivers of a magnetic core memory which are well known in the art may be used. Each generator 44 and 48 drives a half amplitude read current pulse through the memory plane assembly via the current drive lines 42 and 46 respectively. The cores in which a "1" had been stored, would be switched back to the "0" state inducing a pulse upon a sense line (not shown).

After the read current has decayed to zero, the next sequence is commenced to write information in the core. Since the core is now in its "0" state, the generators 44 and 48 wil drive a half amplitude write current pulse through the memory plane via lines 42 and 48 respectively. The write current acting upon the core would, if applied alone, drive the core back to the "1" state. However, if a "0" is to be stored rather than a "1," the inhibit generators 62 and 82 will concurrently drive a quarter amplitude inhibit current on inhibit lines 60 and 80 respectively. The coincidence of the inhibit currents upon the selected core together with the write current would prevent or inhibit the core from switching to the "1" state and retain the core in the "0" state. Thereafter, the write current and inhibit current would decay simultaneously leaving the core in its "0" state.

During the inhibiting sequence, each generator 62 and 82 drives a quarter amplitude inhibit into its appropriate sections of the memory plane via the inhibit current lines 60 and 80 respectively. The sections 72 and 56 have an area which is then common to each section. Further, the common area contains the core which is to be inhibited. Thus, during the inhibiting sequence, only the selected rectangular sections of the memory core are subject to any portion of the inhibit current and its resulting field intensity.

The above embodiment considered a memory comprising bistable magnetic cores. However, the coincident current inhibit system would be applicable for use with other magnetic elements. For example, if a thin film magnetic element was to be utilized, the drive and inhibit lines would be coupled to the magnetic film resulting in an assembly very similar to that of a magnetic core matrix. Further, it is also anticipated that several magnetic members may be combined to form a bistable magnetic element, which element could use the invention coincident current inhibit system. An example of such a combination of magnetic members would be a double core, non-destructive read-out memory. Thus, it is anticipated that any bistable magnetic element may utilize the inventive coincident current system.

Referring to FIGURE 5, the field intensities produced by the inhibit current pulses are illustrated on a diagram representing the first memory plane. The quarter amplitude inhibit current pulses produce one-fourth of the field intensity $H_m$ necessary to switch a core's magnetic state. Thus the resulting field intensity may be represented by $H_m/4$. A rectangular section is then independently subject to a field intensity of $H_m/4$. Since each horizontal and vertical section has a one-sixteenth area of the memory plane in common, this common area is subject to two independent $H_m/4$ field intensities. These independent field intensities are additive since they are in the same relative direction. Thus, an area of $H_m/2$ field intensity results which contains the addressed core to be inhibited.

The net field intensity acting upon the memory plane area during any enhibiting sequence has the following relationships: $9/16$ of the memory plane is undisturbed, $6/16$ of the memory plane is subject to a field intensity of $H_m/4$ and $1/16$ of the memory plane is subject to field intensity of $H_m/2$.

In the magnetic core memory art, if the field intensity disturbanc eon magnetic cores is held to a minimum, several technical advantages result. First, the noise level of operation is greatly reduced. This results directly in fewer transients being introduced into the memory core matrix. Also, the amount of electrical power necessary to produce the inhibit current is minimized. The reduction in noise level of operation can readily be observed by referring to FIGURE 1. First, a magnetic core located in an area undisturbed by the inhibit current field intensity remains at the quiescent value of $-B_r$ (or $+B_r$) level, which level is used for retaining stored information within a magnetic core level which for purpose of discussion herein is defined as a "1." Assume that the magnetic core is at a $-B_r$ (storing a "1") and that the core is subject to a field intensity of $+H_m/2$. The flux density $-B$ of the core will shift along the curve to the valve indicated by point 1. When the field intensity is removed, the new quiescent value of flux density is then $-B_1$, which as can be seen, is less that $-B_r$. The difference in flux density between $-B_r$ and $-B_1$ has been transformed into random noise and transients which have subsequently been distributed throughout the memory. If the same core is subject to additional $+H_m/2$ field intensities, illustrated by points 2 and 3 on the hysteresis curve, the flux density which results, $-B_2$ and $-B_3$ respectively, within the core constantly decreases. Each time the absolute amount of flux density is decreased, additional disturbances are introduced into the magnetic core matrix. The difference in flux density between the $-B_r$ and $-B_3$ indicates the amount of total disturbances introduced into the memory.

In the designing of a magnetic core memory, one attempts to keep at a minimum the amount of and the magnitude of these disturbances. By use of this inventive coincident current inhibit system, the number of cores subject to magnetic disturbances are kept to a minimum. Since this embodiment uses quarter amplitude currents as the basic inhibit current, the amount of the disturbances is reduced greatly relative to half amplitude currents.

When a magnetic core is subject to a field intensity of $+H_m/4$, shown as point 4 in FIG. 1, the quiescent value of flux density is $-B_4$. This value is very nearly $-B_r$, the quiescent state. The significant advantages attained by this condition are: that the time required for the core to return to its quiescent state is greatly lessened; that the time required for the inhibit current to decay to a minimal value is lessened; and finally, that the amount of noise introduced into the memory attributed to the incremental change of flux density B is reduced. The reduction in noise level, however, is dependent upon the squareness of the hysteresis loop of the core. If the core is to have a fast switching speed, and as a result require higher switching power, the hysteresis loop will be extremely square thus making the reduction in noise substantial. If a core is to have a slower switching speed and as a result require less switching power, the core will have a less square hysteresis loop thus resulting in only an appreciable reduction of noise level.

Summarizing, with the inventive coincident current inhibiting system, greater than half of the cores in a memory core, $9/16$ of the total, are subject to no disturbances from the inhibit current. Further, $7/16$ of the total number of cores in a memory plane are subject to a minimal disturbance. Of the $7/16$ of the total number of cores disturbed by the inhibit current, only $1/16$ of the memory plane cores rceive a maximum of $H_m/2$ field intensity. The other $6/16$ of the cores receive a disturbance of $H_m/4$ field intensity.

Consider now a memory reference cycle which includes the total time required to: (a) read the information out of a specific memory location; and (b) the subsequent writing (storing) and inhibiting, if required, of information in this memory location.

Refer to FIGURE 6 which is a graph showing the basic pulses for the storage reference cycle. The timed relationship between the various sequences can be observed. The following values set forth are used as illustrated only, and are not intended to restrict the application of this invention. Beginning at time 0, the read drive currents will be commenced in approximately 65 nanoseconds and will build up a total current with sufficient amplitude to switch a core from a "1" state to a "0" state. The duration of the read current time is 405 nanoseconds. Therefore, at the end of 470 nanoseconds, the read current generators are cut off allowing the read current to decay in approximately 15 nanoseconds. Approximately 90 nanoseconds after the read drivers were terminated, the inhibit current drivers will be initiated. Assuming a core is to be inhibited, the inhibit current will build up its respective current amplitude in approximately 15 nanoseconds. Approximately 25 nanoseconds after the inhibit drivers are initiated, the write drivers are initiated. The write drivers and the inhibit drivers will concurrently be operated for 400 nanoseconds, at which time, the write and inhibit generators will be terminated. Both the write and inhibit currents will then decay in 15 nanoseconds. Therefore, at the end of approximately 1000 nanoseconds, the entire memory reference cycle may be commenced. It is contemplated that variations of the "on" times of the inhibit-write cycle can be made, for example, the write current generator may be commenced at the same time as the inhibit current generator.

The above illustrative embodiment comprises a preferred embodiment of the invention. However, this illustration is not intended to limit the possibilities of insuring the features of coincident current inhibiting of a magnetic core. The coincident current inhibit system disclosed herein is an example of an arrangement in which the inventive features of this disclosure may be utilized and it will become apparent to one skilled in the art that certain modifications may be made within the spirit of the invention as defined by the appended claims.

What is claimed is:
1. A coincident current inhibit system, comprising,
   (a) a plurality of bistable magnetic elements electrically arranged in an array of columns and rows;
   (b) driving means electrically coupled to the elements for selectively energizing a selected element in one sense with sufficient excitation to effect a change of state of the selected element;
   (c) a first inhibiting means for coupling in series the elements of each column, the first inhibiting means including means for energizing the elements in the column having the selected element, simultaneously with and in a sense opposite to that of the driving means; and
   (d) a second inhibiting means for coupling in series the elements of each row, the second inhibiting means including means for energizing the cores in the row having the selected element, simultaneously with and in a sense opposite to that of the driving means and in coincidence with the first inhibiting means, the first inhibiting means and the second inhibiting means in coincidence to have sufficient excitation to prevent a change in state of the selected element.

2. A coincident current inhibit system as set forth in claim 1 wherein the bistable magnetic elements comprise bistable magnetic cores each core having a square hysteresis loop.

3. A coincident current inhibit system, comprising,
   (a) a plurality of bistable magnetic elements electrically arranged in an array of columns and rows;
   (b) read means electrically coupled to the elements for selectively energizing a selected element in one sense and with sufficient excitation to effect a change to one state of the selected element;
   (c) write means electrically coupled to the elements for selectively energizing the selected element sequentially to and in a sense opposite to that of the read means and with sufficient excitation to effect a change to the other state of the selected core;
   (d) a first inhibiting means for coupling in series the cores of each column, the first inhibiting means including means for energizing the element in the column having the selected element, simultaneously with and in a sense opposite to that of the write means; and
   (e) a second inhibiting means for coupling in series the elements of each row, the second inhibiting means including means for energizing the element in the row having the selected core, simultaneously with and in a sense opposite to that of the write means and in coincidence with the first inhibiting means, the first inhibiting means and the second inhibiting means in coincidence to have sufficient excitation to prevent a change in state of the selected element.

4. A coincident current inhibit system as set forth in claim 3 wherein the bistable magnetic elements comprise bistable magnetic cores each having a square hysteresis loop.

5. A coincident current inhibit system, comprising,
   (a) a plurality of bistable magnetic elements electrically arranged in an array of columns and rows, the elements of the column arrangement being electrically divided into a plurality of column sections and the elements of the row arrangement being electrically divided into a plurality of row sections;
   (b) driving means electrically coupled to the elements for selectively energizing a selected element in one sense and with sufficient excitation to effect a change of state of the selected element;
   (c) a plurality of first inhibiting means for coupling in series the elements of each column section, the first inhibiting means including means for energizing the elements in the column section having the selected element, simultaneously with and in a sense opposite to that of the driving means; and
   (d) a plurality of second inhibiting means for coupling in series the elements of each row section, the second inhibiting means including means for energizing the elements in the row section having the selected core, simultaneously with and in a sense opposite to that of the driving means and in coincidence with the first inhibiting means in coincidence to have sufficient excitation to prevent a change in state of the selected element.

6. A coincident current inhibit system as set forth in claim 5 wherein the bistable magnetic elements comprise bistable magnetic cores each having a square hysteresis loop.

7. A coincident current inhibit system, comprising,
   (a) a plurality of bi-stable magnetic elements electrically arranged in an array of columns and rows, the elements of the column arrangement being electrically divided into a plurality of column sections and the elements of the row arrangement being electrically divided into a plurality of row sections;
   (b) read means electrically coupled to the elements for selectively energizing a selected element in one sense and with sufficient excitation to effect a change to one state of the selected element;
   (c) write means electrically conpled to the elements for selectively energizing the selected element sequentially to and in a sense opposite to that of the read means and with sufficient excitation to effect a change to the other state of the selected element;
   (d) a plurality of first inhibiting means for coupling in series the element of each column section, the first inhibiting means including means for energizing the element in the column section having the selected element simultaneously with and in a sense opposite to that of the write means; and (e) a plurality of second inhibit means for coupling in series the elements of each row section, the second inhibiting means including means for energizing the elements in the row section having the selected element, simultaneously with and in a sense opposite to that of the write means and in coincidence with the first inhibiting means and the second inhibiting means in coincidence to have sufficient excitation to prevent a change in state of the selected elements.

8. A coincident current inhibit system as set forth in claim 7 wherein the bistable magnetic elements comprise bistable magnetic cores each having a square hysteresis loop.

9. A coincident current inhibit system, comprising, (a) a plurality of bistable magnetic cores each having a square hysteresis loop requiring a critical magnetizing force to switch the core from one stable state to the other stable state, the plurality of cores being electrically arranged in an array of columns and rows;

(b) driving means electrically coupled to the cores for selectively energizing a selected core in one sense and with an excitation to produce a magnetizing force of $-H_m$ where $H_m$ is slightly greater than the critical magnetizing force to effect a change of state of the selected core;

(c) a first inhibiting means for coupling in series the cores of each column, the first inhibiting means including means for energizing the cores in the column having the selected core, simultaneously with an excitation to produce a magnetizing force of $H_m/4$ and in a sense opposite to that of the driving means; and (d) a second inhibiting means coupling in series the elements of each row, the second inhibiting means including means for energizing the cores in the row having the selected core, simultaneonsly with an excitation to produce a magnetizing force of $H_m/4$ and in a sense opposite to that of the driving means and in coincidence with the first inhibiting means, the first inhibiting means and the second inhibiting means in coincidence to have an excitation of $-H_m/2$ to prevent a change in state of the selected core.

10. A coincident current inhibit system, comprising, (a) a plurality of bistable magnetic cores, each having a square hysteresis loop requiring a critical magnetizing force to switch the core from one stable state to the other stable state, the plurality of cores being electrically arranged in an array of columns and rows; the cores of the column arrangement being electrically divided into a plurality of column sections and the cores of the row arrangement being electrically divided into a plurality of row sections;

(b) driving means electrically coupled to the core for selectively energizing a selected core in one sense and with an excitation to produce a magnetizing force of $-H_m$ where $H_m$ is slightly greater than the critical magnetizing force to effect a change of state of the selected core;

(c) a plurality of first inhibiting means for coupling in series the cores of each column section; the first inhibiting means including means for energizing the elements in the column section having the selected core, simultaneously with an excitation to produce a magnetizing force of $H_m/4$ and in a sense opposite to that of the driving means and;

(d) a plurality of second inhibiting means for coupling in series the cores of each row section, the second inhibiting means including means for energizing the cores in the row section having the selected core, simultaneously with an excitation to produce a magnetizing force of $H_m/4$ and in a sense opposite to that of the driving means and in coincidence with the first inhibiting means, the first inhibiting means and the second inhibiting means in coincidence to have an excitation of $-H_m/2$ to prevent a change in state of the selected core.

References Cited

UNITED STATES PATENTS 3,110,017 11/1963 Thornton _____ 340—174
3,215,992 11/1965 Schallerer _____ 340—174

BERNARD KONICK, *Primary Examiner.*

S. URYNOWICZ, *Assistant Examiner.*